Dec. 26, 1961   A. L. DELVAUX   3,014,711
PRESTRETCHED COILED SPRING FOR INSTALLATION WITHOUT TOOLS
Filed Jan. 11, 1961
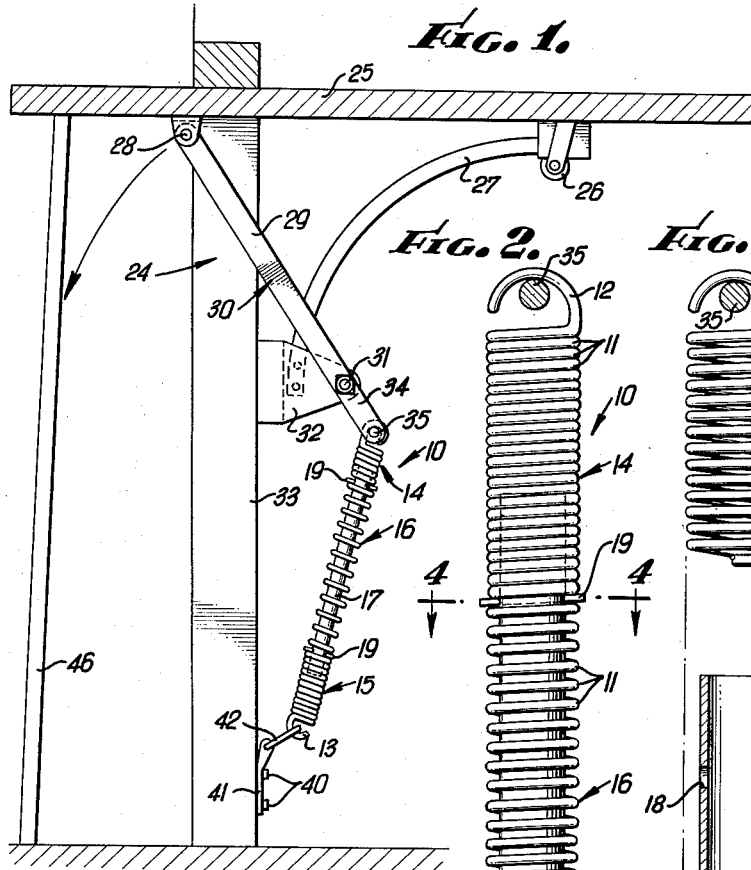
A. L. DELVAUX
INVENTOR:
ATTORNEY.

though the holes 18, whereupon the tension under which the spring is placed is relaxed. Engagement of the pins 19 with coils 11 disposed just outwardly therefrom now retains the section 16 in pre-stretched, tensioned condition.

3,014,711
PRESTRETCHED COILED SPRING FOR INSTALLATION WITHOUT TOOLS
Arthur L. Delvaux, 1918 2nd Ave., Los Angeles, Calif.
Filed Jan. 11, 1961, Ser. No. 82,049
2 Claims. (Cl. 267—1)

This invention relates to heavy contractile coiled springs and particularly to a means for facilitating their installation or removal.

Such springs, as used for counterbalancing garage doors, fold-away beds, automobile hoods and the like, are generally too stiff to be stretched manually in order to install or remove the same.

It is an object of the present invention to provide a novel pre-tensioned spring which will be supplied on the market already elongated under tension and ready for installation thereby relieving the purchaser of the necessity of stretching the spring to install the same.

Another object is to provide a relatively inexpensive means to retain a spring in pre-stretched condition and which may readily be removed or rendered inoperative after the spring is installed.

The manner of accomplishing the foregoing objects as well as further objects and advantages will be made manifest in the following description taken in connection with the accompanying drawings in which:

FIG. 1 is a diagrammatic illustration of a garage door in raised position and with a preferred embodiment of the invention in pre-stretched condition inserted in place in the door counterbalancing mechanism prior to releasing the means for pre-stretching the spring to complete the installation.

FIG. 2 is an enlarged elevational view of the spring shown in FIG. 1 and with the spring in pre-stretched condition.

FIG. 3 is a view similar to FIG. 2 showing the spring of the invention after the means for holding the same pre-stretched has been disengaged from the spring to permit the spring to contract or, if its opposite ends are secured in place, to apply uniform tension to the spring throughout its length.

FIG. 4 is an enlarged cross-sectional view taken on the line 4—4 of FIG. 2.

FIG. 5 is an elevational view of a shorter pre-stretched coiled spring suitable for use in folding beds or in counterbalancing the hoods on automobiles and which comprises a modified form of the invention.

FIG. 6 is an enlarged cross-sectional view taken on the line 6—6 of FIG. 5.

FIG. 7 is an enlarged perspective view of one of the pair of holding plates employed in the modified form of the invention shown in FIGS. 5 and 6.

Referring specifically to the drawings the invention is there shown as preferably embodied in a pre-stretched, heavy coiled contractile spring 10. This is preferably formed of heavy tempered steel wire with the coils 11 thereof normally closely impacted one against the other, the spring 10 having hooks 12 and 13 on its opposite ends and including end sections 14 and 15 in which the coils 11 remain in a normal relation in contact with each other, and a middle pre-stressed section 16 in which adjacent coils 11 are stretched apart and held thus in spaced tensioned relation. This latter effect is attained in the pre-stretched spring 10 by the manufacture of this spring so as to confine therewithin a light metal tube 17 having transverse holes 18 formed therein near its opposite ends.

After the spring 10 has been manufactured with the tube 17 thus confined therewithin, the middle section 16 of the spring is stretched as by a stretching machine, or, for that matter, the entire spring 10 may be stretched so as to stretch the middle section 16 substantially as shown in FIG. 2. While the spring is so stretched, pins 19 are inserted between adjacent spring coils 11 and through the holes 18, whereupon the tension under which the spring is placed is relaxed. Engagement of the pins 19 with coils 11 disposed just outwardly therefrom now retains the section 16 in pre-stretched, tensioned condition.

As already noted, it is the purpose of the present invention to manufacture heavy contractile springs such as the coil spring 10 with a section of the spring pre-stretched under tension and retained in this condition by a suitable compression means such as the tube 17 and pins 19. The spring 10 thus pre-stretched is delivered through the channels of trade and sold to the ultimate purchaser in condition permitting him to install this in some particular place where it is adapted to be used such as in a counterbalancing mechanism 24 of a garage door 25, and to do this without the necessity of the individual installing the same having to stretch the spring in order to get it into place with the opposite ends of the spring anchored at points between which the spring is normally under tension.

FIG. 1 illustrates a garage door 25, one side of which is shown diagrammatically as suspended on rollers 26 guided by a track 27 and as also being pivotally connected by a pin 28 to an arm 29 of a lever 30 having a fulcrum bolt 31 provided on a bracket 32 mounted on a doorpost 33. The other arm 34 of the lever 30 has a spring anchoring pin 35 for connecting the hook 12 of the spring 10 to this arm. Secured as by lag screws 40 to the lower end of post 33 is a bracket 41 having a ring 42 pivotally mounted in its upper end which ring is adapted to be slipped over the hook 13 of spring 10 when installing the latter in the door balancing mechanism 24.

As diagrammatically shown in FIG. 1, the door 25 is shown held in open position by a prop 46. Dependence is normally had upon one or more of the springs 10 pulling downwardly on the arm 34 of the lever 30 when the door 25 is in its upwardmost position to retain the door thus opened. The pre-stretched spring 10 of the invention enables an individual to install such a spring in the counterbalancing mechanism 24 in his own garage without himself having to stretch the spring, and yet it will be under tension when applied to the pin 35 and link 42 at the time the door 25 is open.

To do this the door 25 is first propped open as shown in FIG. 1. The pre-stretched spring 10 is then applied with the hook 12 thereof encircling the pin 35, and the hook 13 at the lower end of spring 10 is hooked into the ring 42 as shown in FIG. 1. This is quite easy to do because of the pre-stretched condition of the spring 10 when it is so applied. To complete the installation it is only necessary to remove prop 46 and swing the door 25 down to closed position which stretches end sections 14 and 15 of spring 10 so as to place these under the same tension as middle section 16 thereof. This relieves the pins 19 from excessive frictional pressure thereagainst by adjacent spring coils 11 and enables these pins to be removed either by a pair of pliers, or even by hand. When door 25 is now opened, the prop 46 is unnecessary to hold it open (as in FIG. 1) because spring 10 is stretched tightly between pin 35 and ring 42.

After the spring 10 has thus been installed, the tube 17 drops to the lower end of the spring and remains confined therein. Thus whenever it is desired to remove the spring 10 from its assembly with the balancing mechanism 24, it is only necessary to lower the door 24, thus placing the spring 10 under substantial elongating tension, and then reinsert pins 19 in the holes 18 so that when the door 25 is opened again, and propped open as shown in FIG. 1, the middle section 16 of the spring 10 will be stretched so that the length of the spring 10 thus pre-stretched will be substantially as shown in FIG. 1 whereby it may be removed from the pin 35 and the ring 42 without any necessity for the manual stretching of the spring 10 to accomplish this removal.

The modified form of spring 50 of the invention shown in FIGS. 5, 6 and 7 also comprises a coiled contractile spring embodying closely compacted coils 51 with hooks 52 and 53 at its opposite ends and including unstretched upper and lower sections 54 and 55 and a central stretched section 56. The stretching of the section 56 in the spring 50 is accomplished by stretching the entire spring and then applying a pair of arcuate plates 57 to opposite faces of the spring so that dogs 58 outstruck from opposite end portions of the plates 57 are inserted between adjacent coils 51 of the spring 50 at opposite ends of the stretched section 56 so that when stretching tension applied to hooks 52 and 53 in stretching the spring is relaxed the dogs 58 retain the middle section 56 of the spring in pre-stretched condition as shown in FIG. 5.

The spring 50 is of the short type which is required in many installations of a counterbalancing spring such as in wall beds and in automobile hoods. After the pre-stretched spring 50 is inserted in place in whatever counterbalancing mechanism it is to be used, the mechanism is actuated to stretch this spring so as to relax pressure of the spring coils 51 on the dogs 58 whereupon the latter slip from between adjacent coils 51 at opposite ends of the pre-stretched section 56 thereby allowing plates 57 to fall away from spring 50 and completing the installation of this spring in said mechanism.

The claims are:

1. An article of manufacture comprising: a heavy coiled-wire contractile spring having hooks formed in its opposite ends; a compression resisting member which is shorter than said spring when the latter is contracted, said member being confined within said spring, a section of said spring, substantially less than its entirety, and substantially shorter than said member, when contracted, being pre-stretched in the manufacture of said article to substantially elongate said section and a pair of elements removably associated with end portions of said member for engagement with coils of said spring at the respective ends of said pre-stretched section thereof to retain the latter so stretched until after the installation of said spring at its point of use.

2. An article of manufacture as defined in claim 1 in which said compression resisting member has transverse apertures near its ends, and in which said coil engaging elements comprise pins insertable in and readily withdrawable from said apertures.

References Cited in the file of this patent

UNITED STATES PATENTS

| | | |
|---|---|---|
| 2,589,042 | Brenneman | Mar. 11, 1952 |
| 2,883,742 | Prath | Apr. 28, 1959 |
| 2,903,786 | Sheffield | Sept. 15, 1959 |